United States Patent
Lyustin et al.

(10) Patent No.: US 7,095,403 B2
(45) Date of Patent: Aug. 22, 2006

(54) USER INTERFACE OF A KEYPAD ENTRY SYSTEM FOR CHARACTER INPUT

(75) Inventors: Victoria Lyustin, South San Francisco, CA (US); Robert Michael Harman, Mountain View, CA (US); Ali Ebrahimi, Half Moon Bay, CA (US)

(73) Assignee: Motorola, Inc., Schaumburg, IL (US)

( * ) Notice: Subject to any disclaimer, the term of this patent is extended or adjusted under 35 U.S.C. 154(b) by 432 days.

(21) Appl. No.: 10/314,650

(22) Filed: Dec. 9, 2002

(65) Prior Publication Data

US 2004/0204011 A1    Oct. 14, 2004

(51) Int. Cl.
*G09G 5/00* (2006.01)
(52) U.S. Cl. .................. 345/171; 345/169; 341/28
(58) Field of Classification Search ........ 345/168–172; 341/22–28; 340/407.1–407, 407.2
See application file for complete search history.

(56) References Cited

U.S. PATENT DOCUMENTS 6,356,258 B1 * 3/2002 Kato et al. ................. 345/168

2003/0122785 A1 * 7/2003 Jayachandra ............... 345/171

FOREIGN PATENT DOCUMENTS

JP    11353096 A   * 12/1999

OTHER PUBLICATIONS

Chamrat Atsawaprecha, "Thai Input and Output Methods," Feb. 12, 1992.*

* cited by examiner

*Primary Examiner*—Regina Liang
(74) *Attorney, Agent, or Firm*—Hisashi D. Watanabe

(57) ABSTRACT

A user interface (102) of a portable electronic device (100) includes a plurality of keys (112). The user interface (102) includes a first group of keys representing vowel characters (402), and a second group of keys representing consonant characters (202). The second group of keys is separate from the first group of keys. For the first group of keys, a first key represents leading vowels (422, 424, 426), a second key represents above and below vowels (428, 430), and a third key represents following vowels (432, 434, 436). The second group of keys may be subdivided into phonetic consonant groups (FIGS. 5 & 6) or alphabetic consonant groups (FIGS. 7 & 8).

10 Claims, 8 Drawing Sheets

| KEY | PHONETIC GROUP | NAME (TACTIS) | CHARACTER |
|---|---|---|---|
| 1 | G (UNASPIRATED K) _214_ | Go Gai (A1) | ก |
| 1 | Kh (ASPIRATED K) _216_ | Kho Khai (A2)<br>Kho Khwai (A4)<br>Kho Rakhang (A6) | ข ค ฆ |
| 1 | Ng _218_ | Ngo Ngu (A7) | ง |
| 2 | J _222_ | Jo Jan (A8) | จ |
| 2 | Ch _224_ | Cho Ching (A9)<br>Cho Chang (AA)<br>Cho Choe (AC) | ฉ ช ฌ |
| 2 | N _226_ | No Nen (B3)<br>No Nu (B9) | ณ น |
| 3 | D _230_ | Do Chada (AE)<br>Do Dek (B4) | ฎ ด |
| 3 | Dt (UNASPIRATED T) _232_ | Dto Bpadtak (AF)<br>Dto Dtao (B5) | ฏ ต |
| 3 | Th (ASPIRATED T) _234_ | Tho Than (B0)<br>Tho Nangmontho (B1)<br>Tho Phuthao (B2)<br>Tho Thung (B6)<br>Tho Thahan (B7)<br>Tho Thong (B8) | ฐ ฑ ฒ ถ ท ธ |
| 4 | B _238_ | Bo Baimai (BA) | บ |
| 4 | Bp (UNASPIRATED P) _240_ | Bpo Bpla (BB) | ป |
| 4 | Ph (ASPIRATED P) _242_ | Pho Phung (BC)<br>Pho Phan (BE)<br>Pho Samphao (C0) | ผ พ ภ |
| 4 | F _244_ | Fo Fa (BD)<br>Fo Fan (BF) | ฝ ฟ |

*FIG. 2*

| KEY (210) | PHONETIC GROUP (204) | NAME (TACTIS) (206, 208) | CHARACTER (202) |
|---|---|---|---|
| 5 | M | *304* Mo Ma (C1) | ม |
| 5 | Y | *306* Yo Ying (AD)<br>Yo Yak (C2) | ญย |
| 5 | R | *308* Ro Rua (C3) —314<br>Ru (VOCALIC R) (C4) —312 | ร ฤ |
| 5 | L | *310* Lo Ling (C5)<br>Lo Jula (CC) | ล ฬ |
| 6 | W | *318* Wo Waen (C7) | ว |
| 6 | S | *320* So So (AB)<br>So Sala (C8)<br>So Rusi (C9)<br>So Sua (CA) | ซ ศ ษ ส |
| 6 | H | *322* Ho Hip (CB)<br>Ho Nokhuk (CE) | ห ฮ |
| 6 | null | *324* O Ang (CD) | อ |

302 { rows with KEY 5 }
316 { rows with KEY 6 }

*FIG. 3*

| KEY | CLASS | NAME (TACTIS) | CHARACTER |
|---|---|---|---|
| 7 | LEADING VOWEL 422 | Sara E (E0)<br>Sara Ae (E1) | เ แ |
| 7 | LEADING VOWEL 424 | Sara O (E2) | โ |
| 7 | LEADING VOWEL 426 | Sara Ai Mai Muan (E3)<br>Sara Ai Mai Malai (E4) | ใ ไ |
| 8 | ABOVE VOWEL 428 | Sara I (D4) −412<br>Sara Ii (D5) −414<br>Sara Ue (D6) −416<br>Sara Uee (D7) −418 | ิ ี ึ ื |
| 8 | BELOW VOWEL 430 | Sara U (D8)<br>Sara Uu (D9) | ุ ู |
| 9 | FOLLOWING VOWEL 432 | Sara A (D0) | ะ |
| 9 | FOLLOWING VOWEL 434 | Sara Aa (D2)<br>Sara Am (D3) | า ำ |
| 9 | FOLLOWING VOWEL 436 | Ru (C4) −312 | ฤ |
| 9 | PUNCTUATION 440 | Mai Yamok (E6)<br>Pai Yan Noi (CF) | ๆ ฯ |
| 0 | TONE MARK 444 | Mai Ek (E8)<br>Mai Tho (E9)<br>Mai Tri (EA)<br>Mai Chattawu (EB) | ่ ้ ๊ ๋ |
| 0 | CONTRACTED ABOVE VOWEL 446 | Mai Han Akat (D1)<br>Mai Tai Khu (E7) | ั ็ |
| 0 | OTHER 448 | Thanthakhat OR (EC)<br>Gaaran | ์ |

*FIG. 4*

USER INTERFACE OF A KEYPAD ENTRY SYSTEM FOR CHARACTER INPUT

FIELD OF THE INVENTION

The present invention relates to the field of keypad entry systems that provide convenient processes for character input. More specifically, the present invention relates to a system having symbols assigned to the keys of a keypad in a novel and convenient manner for character input, particularly for strongly consonant-vowel ("CV") typed languages.

BACKGROUND OF THE INVENTION

The computer industry utilizes character encoding systems for a variety of languages around the world. One example of a character encoding system used by the computer industry is the Thai API Consortium/Thai Industrial Standard ("TACTIS") which is used for the Thai language. The TACTIS code set consists of the ASCII (ISO 646-1983) character set and the TIS 620-2533 character set. The TIS 620-2533 character set includes Thai characters categorized as consonants, vowels, tone marks, diacritics, and noncomposibles. Examples of noncomposibles include punctuation marks and Thai digits.

Unlike the developers of the computer industry, developers of portable electronic devices must implement user interfaces having a limited number of keys. Of particular interest are strongly CV-typed languages having a strong consonant-vowel ("CV") type, such as Thai, Lao, Khmer, Myanmar, Korean, Tibetan, Hebrew, Arabic, and Indian languages such as Hindi and Tamil. Such languages often have a large alphabet and, thus, use many different characters. For example, an interface for Thai must support over 60 characters. On the other hand, portable electronic devices, typically have only twelve or so keys of which ten keys are used for entering the numbers "1" through "9" and "0". Therefore, it is quite challenging to design a portable electronic device that permits a user to input the numerous characters of a strongly CV-typed language using the limited number of keys in a standard keypad.

Accordingly, there is a need for a keypad entry system for character entry capable of addressing the numerous characters of a strongly CV-typed language. In particular, there is a need for a keypad entry system for character input that distributes consonants and vowels throughout the keypad in an intuitive configuration.

BRIEF DESCRIPTION OF THE DRAWINGS

FIG. 2 is a tabular view representing a portion of the user interface of FIG. 1 corresponding to consonant characters of the Thai language.

FIG. 3 is a tabular view representing another portion of the user interface of FIG. 1 corresponding to more consonant characters of the Thai language.

FIG. 4 is a tabular view representing a yet another portion of the user interface of FIG. 1 corresponding to vowel characters of the Thai language.

DETAILED DESCRIPTION OF THE PREFERRED EMBODIMENTS

The present invention is a user interface of a portable electronic device having a plurality of keys. The user interface comprises a first group of keys representing vowel characters, and a second group of keys representing consonant characters. Although part of the same plurality of keys, the second group of keys is separate from the first group of keys. In particular, the first group of keys is subdivided based on vowel class, in which vowel classes are defined based upon properties including, but not limited to, position relative to consonants, character shape, and pronunciation.

It should be noted that, because of the similar usage of vowels, tone marks and diacritics, the terms "vowel" or "vowels" refer to a larger class of non-consonant alphabetic characters that includes vowels, diacritics representing contracted vowels, tone marks, and non-vowel diacritics.

The preferred embodiments described below use the Thai language. The vowels of the Thai writing system (which is a character-based, left-to-right system much like English) appear in various positions relative to the consonant they follow in the pronunciation of the text. In particular, leading vowels are written to the left of a consonant, but pronounced after it. Similarly, above vowels, below vowels, and following vowels are written above, below, or to the right of a consonant (respectively) but are all pronounced after that consonant. Certain other non-consonant characters also have positional properties, always appearing to the left of, above, below, or to the right of an associated consonant.

These properties are used to establish positional classes of vowel characters for the preferred embodiments described below. A first key represents leading vowels, a second key represents above and below vowels, and a third key represents following vowels. The second group of keys represents consonant characters and may be subdivided into phonetic or alphabetic groups.

Figure 1:
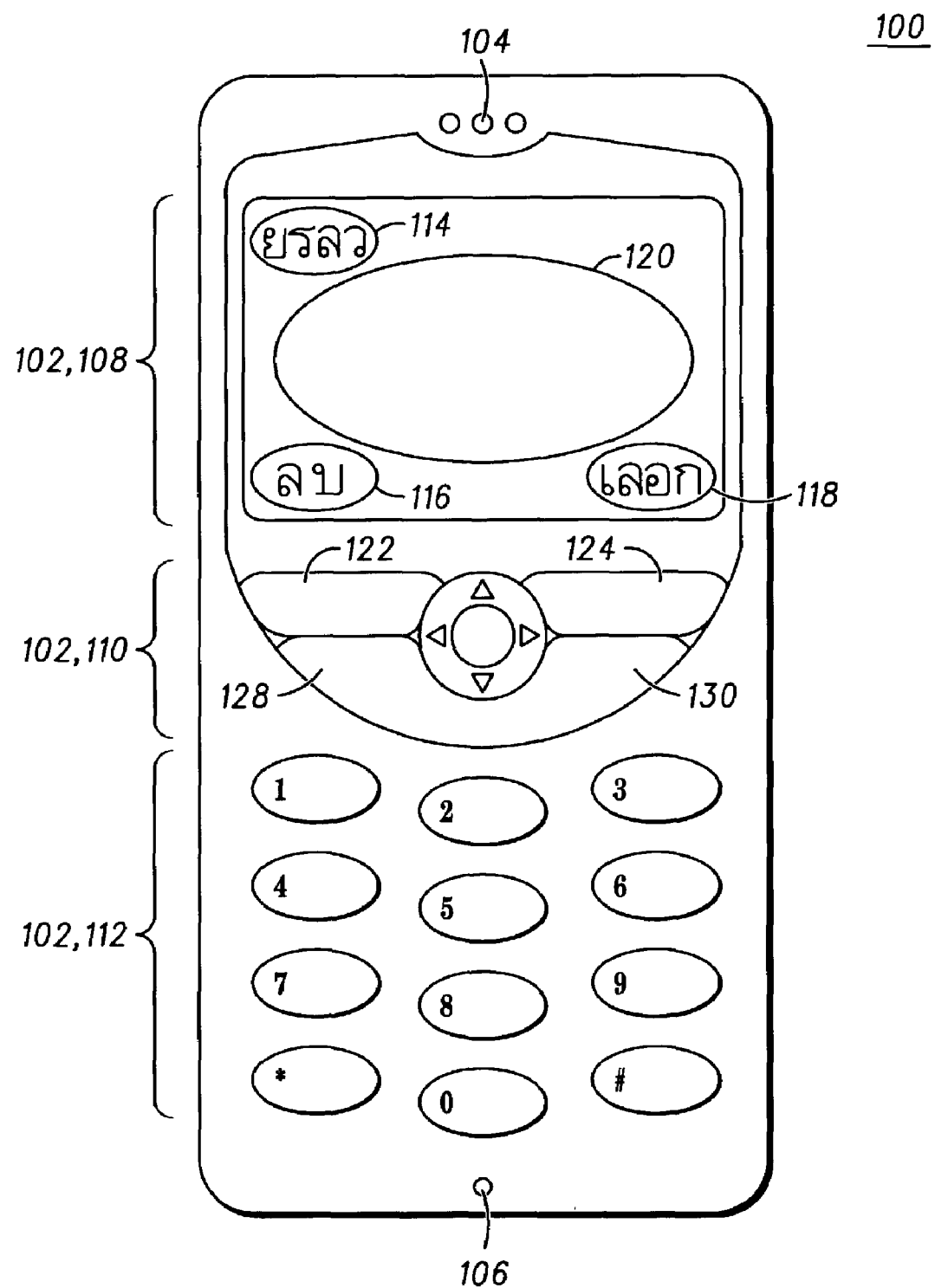
FIG. 1 is a perspective view of a portable electronic device having a user interface in accordance with the present invention.

Referring to FIG. 1, there is shown an exemplary portable electronic device 100 having a user interface 102 in accordance with the present invention. The portable electronic device 100 is any type of device that may benefit from a user interface 102 of a keypad entry system for character input. For example, the device may be, but is not limited to, a radiotelephone (such as a cellular phone or two-way radio), a paging device, a personal digital assistant, a handheld computer, an audio/video device (such as a television or an MP3 player), a network browsing device, and any type of computer having a limited number of input keys.

In addition to the user interface 102, the preferred embodiment of the portable electronic device 100 is a radiotelephone having an audio output 104 and an audio input 106. In addition, the preferred embodiment includes a processor, a memory circuit, and a power supply working in conjunction with the user interface 102 to perform various functions of the device input as well as a transceiver circuit for wireless communication with remote devices. Conventional processors, memory circuits, power supplies and transceiver circuits may be used for the preferred embodiment and, thus, are not shown in the drawings.

The user interface 102 includes a display 108, selection buttons 110, and data entry keys 112. The display 108 may show a variety of indicators at the top, bottom and sides of its screen (such as a power supply indicator and a signal power indicator) as well as text and/or graphics in the middle of the screen. For the preferred embodiment, current input mode icons 114 are shown at the top of the display 108, labels 116, 118 corresponding the selection buttons 110 are shown at the bottom of the display, and a main text/alternates area 120 is shown in the middle of the display. The selection buttons 110 may be used to navigate operations of the display and, otherwise, provide functionality to the device. For the preferred embodiment, the selection buttons 110 include a left soft key 122, a right soft key 124, and a multiple-way navigation disc 126. Each soft key 122, 124 may have multiple functions, so the corresponding labels 116, 118 may identify a current function for these soft keys. Also, for the preferred embodiment, the selection buttons 110 include off-hook and on-hook buttons 128, 130 for operation of the device 100 as a radiotelephone.

The data entry keys 112 include ten or more keys arranged in an ordered array in which each key is associated with a numeric or symbolic digit. The numeric or symbolic digits include "0" through "9", a star symbol ("*") and a pound sign ("#"). In addition, each key of the data entry keys 112 is also associated with multiple consonant characters, multiple vowel characters, or some other group of characters.

The primary forms of data entry for the portable electronic device 100 are multitap text entry and predictive text entry. For multitap text entry, a user presses a key once for entry of the key's first symbol, twice for entry of the key's second symbol, and so on. For predictive text entry, the user presses a key once of each symbol and the system predicts the character that is being entered by the user. Predictive text entry is preferred because it requires, on average, fewer key presses for entry of each symbol.

Two preferred keypad layouts are described below. For both preferred keypad layouts, keys "1" through "6" of the user interface are designated as consonant keys and keys "7" through "9" of the user interface are designated as vowel keys. The general distribution of vowel characters throughout keys "7" through "9" is similar for both preferred keypad layouts, but the distribution of consonant characters throughout keys "1" through "6" differ for the two layouts. In particular, a first preferred keypad layout distributes consonant characters based on phonetic consonant grouping, whereas the second preferred keypad layout distributes consonant characters based on alphabetical order.

The preferred embodiments utilize the Thai language to exemplify the features of the present invention. However, it is to be understood that the present invention may be applied to any strongly CV-typed language and is particularly useful for languages having a large alphabet. Accordingly, the present invention is applicable to, but not limited to, Thai, Lao, Khmer, Myanmar, Korean, Tibetan, Hebrew, Arabic, and Indian languages such as Hindi and Tamil, and the like. Note that certain Thai characters are considered archaic or obsolete, so the characters included in the preferred embodiments may not cover all existing Thai characters.

Referring to FIGS. 2 and 3, consonant characters 202 of the first preferred keypad layout are split into phonetic groups 204 based on pronunciation. Most phonemes in the Thai language are associated with more than one consonant character 202. For example, different consonant characters are needed for high tones and low tones. Thus, for the present invention, consonant characters 202 are divided into phonetic groups 204 so that one or more phonetic groups may correspond to a particular key of a user interface 102. These phonetic groups 204 range from one to six characters each. Character names 206 and TACTIS hexadecimal encoding values 208 are provided in FIGS. 2 through 4 (as well as FIGS. 5 and 7) adjacent to each character or name to facilitate universal identification of the characters. In addition, the associated keys are identified by key column 210 of FIGS. 2 and 3.

Referring specifically to FIG. 2, key "1" 212 of the first preferred keypad layout corresponds to the G, Kh and Ng phonetic groups 214, 216, 218. The G phonetic group 214 includes the Go Gai character, the Kh phonetic group 216 includes the Kho Khai, Kho Khwai, and Kho Rakhang characters, and the Ng phonetic group 218 includes the Ngo Ngu character. The G phonetic group 214 is also known as the unaspirated K phonetic group, and the Kh phonetic group 216 is also known as the aspirated K phonetic group.

Key "2" 220 of the first preferred keypad layout corresponds to the J, Ch and N phonetic groups 222, 224, 226. The J phonetic group 222 includes the Jo Jan character, the Ch phonetic group 224 includes the Cho Ching, Cho Chang and Cho Choe characters, and the N phonetic group 226 includes the No Nen and No Nu characters.

Key "3" 228 of the first preferred keypad layout corresponds to the D, Dt and Th phonetic groups 230, 232, 234. The D phonetic group 230 includes the Do Chada and Do Dek characters, the Dt phonetic group 232 includes the Dto Bpadtak and Dto Dtao characters, and the Th phonetic group 234 includes the Tho Than, Tho Nangmontho, Tho Phuthao, Tho Thung, Tho Thahan and Tho Thong characters. The Dt phonetic group 232 is also known as the unaspirated T phonetic group. The Dt group 232 is closely related to both the D group 230 and the Th group 234, and could be combined with one or the other to form a larger phonetic group.

Key "4" 236 of the first preferred keypad layout corresponds to the B, Bp, Ph and F phonetic groups 238, 240, 242, 244. The B phonetic group 238 includes the Bo Baimai character, the Bp phonetic group 240 includes the Bpo Bpla character, the Ph phonetic group 242 includes the Pho Phung, Pho Phan and Pho Samphao characters, and the F phonetic group 244 includes the Fo Fa and Fo Fan characters. The Bp phonetic group 240 is also known as the unaspirated P phonetic group, and the Ph phonetic group 242 is also known as the aspirated P phonetic group. The Bp group 240 is closely related to both the B group 238 and the Ph group 242, and could be combined with one or the other to form a larger phonetic group.

Referring to FIG. 3, key "5" 302 of the first preferred keypad layout corresponds to the M, Y, R and L phonetic groups 304, 306, 308, 310. The M phonetic group 304 includes the Mo Ma character, the Y phonetic group 306 includes the Yo Ying and Yo Yak characters, the R phonetic group 308 includes the Ro Rua and Ru (vocalic R) characters, and the L phonetic group 310 includes the Lo Ling and Lo Jula characters.

It is important to note the mixed consonant/vowel nature of the Ru character 312. The Ru character 312 is actually a vowel and, for an alternative embodiment, may be grouped with the vowels of keys "7" through "9". However, for the first preferred keypad layout, the Ru character 312 is associated with the R phonetic group 308 because its pronunciation is similar to the Ro Rua character 314 of the R phonetic group.

Key "6" 316 of the first preferred keypad layout corresponds to the W, S, H and null phonetic groups 318, 320, 322, 324. The W phonetic group 318 includes the Wo Waen character, the S phonetic group 320 includes the So So, So Sala, So Rusi and So Sua characters, the H phonetic group 322 includes the Ho Hip and Ho Nokhuk characters, and the null phonetic group 324 includes the O Ang character.

Referring to FIG. 4, vowel characters 402 are split into their positional classes 404, namely leading vowel ("LV") 406, above and below vowels 408 ("AV" & "BV"), and following vowel ("FV") 410. Most vowel characters 402 come in pairs: one with a short pronunciation and the other with a long pronunciation. These pairs generally have similar morphology, and appear in the same position. Also, some vowel pairs have quite similar morphology and seem to be classed together by native speakers. The "umbrella-shaped vowels", namely Sara I 412, Sara Ii 414, Sara Ue 416 and Sara Uee 418, are an example of such vowel pairs.

As stated above, in the second preferred keypad layout, the consonants are distributed throughout the consonant keys in alphabetic groups, i.e., groups based on alphabetical order. The associated keys are identified by key column 702 of FIG. 7.

Also, as stated above, the vowel characters 402 are distributed throughout the vowel keys of the user interface 102 in a substantially similar manner for the first and second preferred keypad layouts. Key "7" 406 of the preferred keypad layouts corresponds to three subclasses of the class of leading vowels 422, 424, 426. A first subclass of leading vowels 422 includes the Sara E and Sara Ae characters, a second subclass of leading vowels 424 includes the Sara O character, and a third subclass of leading vowels 426 includes the Sara Ai Mai Muan and Sara Ai Mai Malai characters.

Key "8" 408 of the preferred keypad layouts corresponds to a class of above and below vowels 428, 430. This class includes a subclass of above vowels 428 and a subclass of below vowels 430. The subclass of above vowels 428 includes the Sara I, Sara Ii, Sara Ue and Sara Uee characters 412–418. The subclass of below vowels 430 includes the Sara U and Sara Uu characters.

Key "9" 410 of the preferred keypad layouts corresponds to two or three subclasses of the class of following vowels 432, 434, 436. As shown in FIG. 4, key "9" may also correspond to a subclass of punctuation 440. A first subclass of following vowels 432 includes the Sara A character, and a second subclass of following vowels 434 includes the Sara Aa and Sara Am characters. Optionally, key "9" may correspond to a third subclass of following vowels 436 that includes the Ru character 312. As stated above, the Ru character 312 is a vowel character that has a pronunciation that is similar to one of the phonetic groups of the consonant characters and, thus, may be relocated to that phonetic group. Specifically, the Ru character 312 is associated with the R phonetic group 308 of the first preferred keypad layout, but the Ru character is associated with the following vowels 410 of the second preferred keypad layout.

Consonant and vowel characters may also be associated with other keys of the user interface as well. For example, for the preferred keypad layouts, at least one vowel is also associated with key "0" (zero).

The user interface of the present invention may also include tone marks, contracted above vowels, diacritics, punctuation and the like. For example, key "9" 410, 438 of the preferred keypad layouts corresponds to a subclass of punctuation 440 as well as the subclass of the following vowels 432, 434, 436. The subclass of punctuation 440 includes the Mai Yamok character and the Bpai Yan Noi character.

Key "0" 442 of the preferred keypad layouts corresponds to subclasses 444, 446, 448 of tone marks, contracted above vowels, diacritics and punctuation. A subclass of tone marks 444 includes the Mai Ek character, the Mai Tho character, the Mai Tri character, and the Mai Chattawa character. A subclass of contracted above vowels 446, such as the Mai Han Akat character and the Mai Tai Khu character, includes contracted forms of a vowel in the presence of a final consonant. A subclass of diacritics includes the Thanthakhat character, also known as Gaaran.

Referring to FIGS. 5 through 8, the preferred keypad layouts are data entry keys 112 for entering Thai characters into a portable electronic device 100. The data entry keys 112 include ten or more keys arranged in an ordered array in which each key is associated with a numeric or symbolic digit, Roman letters, and/or multiple consonant and/or vowel characters. The preferred keypad layouts have consonant characters distributed across certain keys and vowel characters distributed across other keys, in which each key corresponds to multiple characters. In particular, most consonant characters correspond to keys "1" through "6", and most vowels correspond to keys "7" through "9". Regarding the consonant characters in particular, all consonant characters included in the interface for the preferred embodiments are mapped to keys "1" through "6". Of course, it should be recognized that not all consonants need to be included in the interface, since some consonants may be considered to be archaic and no longer commonly used.

Figure 5:
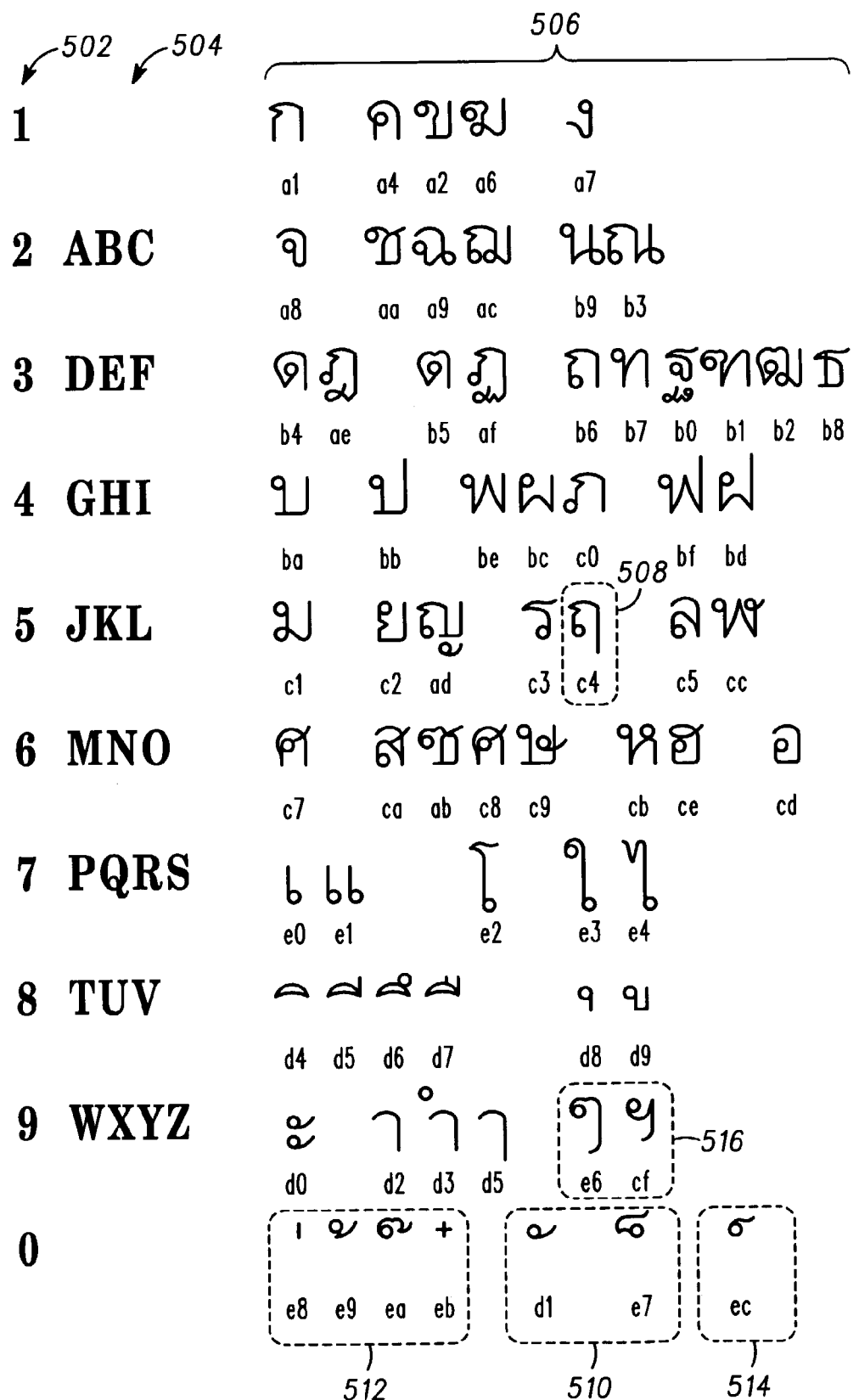
FIG. 5 is a tabular view representing a first preferred keypad layout of the user interface of FIG. 1.

Referring to FIG. 5, a listing of the first preferred keypad layout in which the consonant characters are arranged phonetically. The numbers in the left-hand column 502 are the numerals shown on the user interface, and the capitalized Roman letters in the middle column 504 are the characters typically shown on the user interface. The Thai characters in the right-hand column 506 may be subdivided into three categories: (1) consonant characters, (2) vowels or diacritics representing contracted forms of vowels, (3) tone marks, diacritics that are not vowel-related, and punctuation marks. The hexadecimal value based on TACTIS 208 is shown below each character. For the first preferred keypad layout, the consonant characters are associated with keys "1" through "6", and the vowel characters are associated with keys "5", "7" through "9", and "0" (zero). Generally, the vowel characters are associated with keys "7" through "9", but the two contracted above vowels (TACTIS D1) 510, 446 are associated with key "0". For the first preferred keypad layout, one following vowel 508, 436 is associated with key "5". Also, the tone marks 512, 444 and diacritic 514, 448 are associated with key "0", and the punctuation marks 516, 440 are associated with key "9".

Figure 6:
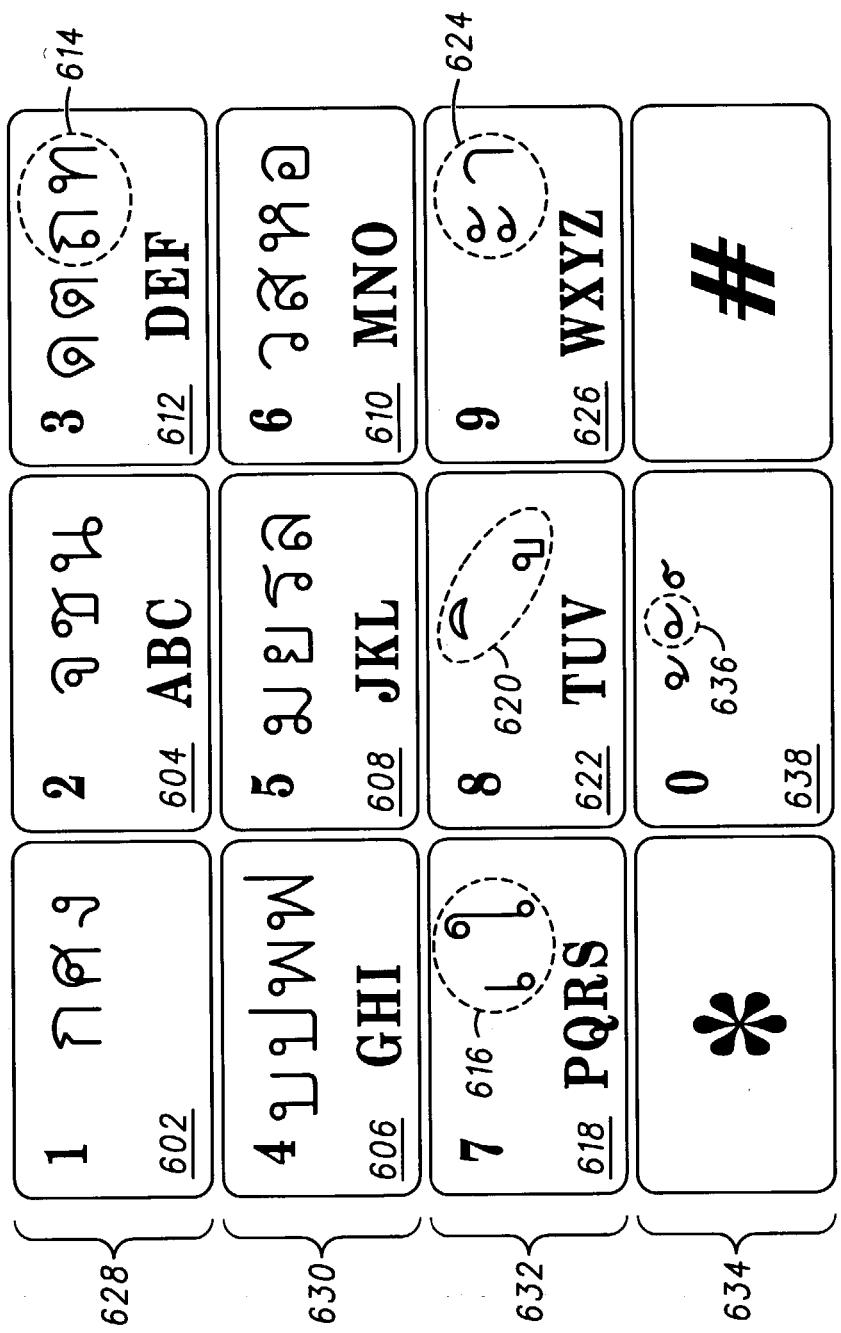
FIG. 6 is planar view of the first preferred keypad layout of FIG. 5.

Referring to FIG. 6, there is shown the first preferred keypad layout represented by FIG. 5. Due to the limited space available for printing characters on the surfaces of the keys, only a few select, representative characters are shown on the face of the keys. The select, representative characters are selected based upon the most commonly used character or characters of each group. Generally, for the consonant characters, one character representing a particular phonetic group is provided on the face of each key. For example, for key "1" 602, one character from each of the three phonetic groups, namely G, Kh and Ng, is shown on the face of the key. Similarly, for keys "2" 604, "4" 606, "5" 608 and "6" 610, one character from each of the phonetic groups, namely J, Ch, N, B, Bp, Ph, F, M, Y, R, L, W, S, H and null, is shown on the face of the corresponding key. Key "3" 612 is an exception in which one character from each of the D and Dt phonetic groups is shown, but two characters from the Th phonetic group 614 are also shown. Although one representative character would suffice for key "3" 612, the first preferred keypad layout includes two characters representing the Th phonetic group 614 since it represents the most characters, i.e. six characters.

For the vowel characters, there is at least one character on the face of each key to represent each group of vowel classes. For the first preferred keypad layout, two characters are shown representing each group of vowel classes. In particular, the Sara E and Sara Ai Mai Muan characters 616 representing the leading vowels are shown on key "7" 618, the Sara I and Sara Uu characters 620 representing the above and below vowels are shown on key "8" 622, and the Sara A and Sara Aa characters 624 representing the following vowels are shown on key "9" 626. Also, with the exception of the second subclass 424 of the class of leading vowels 406, i.e., representing the Sara O character, a representative character is shown for each subclass 422 & 426–436 of the vowel characters.

The keys representing consonant characters are generally grouped together in one group, and the keys representing the vowel character are generally grouped together in another group substantially separate from the group of consonant characters. As shown in FIG. 6, the keys for the consonant characters are adjacent to each other and are collectively grouped together within the upper half of the keypad layout, i.e., within the first two rows 628, 630 of the user interface 102. Likewise, the keys for the vowel characters are adjacent to each other and collectively grouped together within the lower half of the keypad layout, i.e., within the third and fourth rows 632, 634 of the user interface 102. In fact, most of the vowel characters are located in the third row 632 of the user interface 102. There are two exceptions. The first is the Ru (C4) character 508, 436, 312, which is associated with key "5" 608 as a member of the R phonetic group 308, represented by the Ro Rua (C3) character 640, 314. The second is the contracted above vowel group 510, 446, which is associated with key "0" 638, represented by the Mai Han Akat (D1) character 636.

Figure 7:
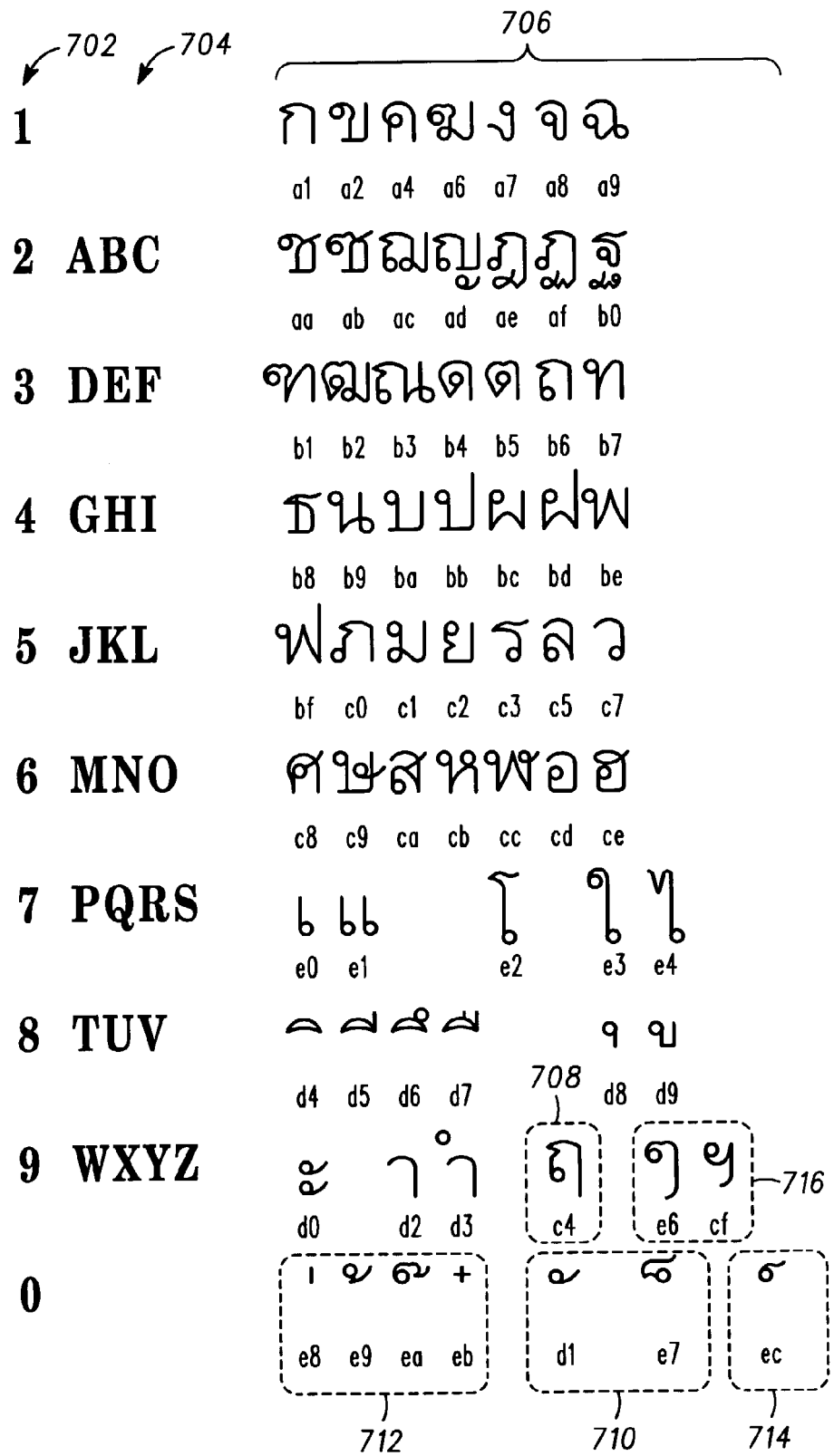
FIG. 7 is a tabular view representing a second preferred keypad layout of the user interface of FIG. 1.

Referring to FIG. 7, a listing of the second preferred keypad layout in which the consonant characters are arranged alphabetically. Similar to the phonetic arrangement described in FIG. 5, the numbers in the left-hand column 702 are the numerals shown on the user interface, and the capitalized Roman letters in the middle column 704 are the characters typically shown on the user interface 102. The Thai characters in the right-hand column 706 may be subdivided into three categories: (1) consonant characters, (2) vowels or diacritics representing contracted forms of vowels, (3) tone marks, diacritics that are not vowel-related, and punctuation marks. The hexadecimal value based on TACTIS 208 is shown below each character. For the second preferred keypad layout, the consonant characters are associated with keys "1" through "6", and the vowel characters are associated with keys "7" through "9" and "0" (zero). Generally, the vowel characters are associated with keys "7" through "9" but two contracted above vowels 710, 446 are associated with key "0". Also, the tone marks 712, 444 and diacritic 714, 448 are associated with key "0", and the punctuation marks 716, 440 are associated with key "9".

Figure 8:
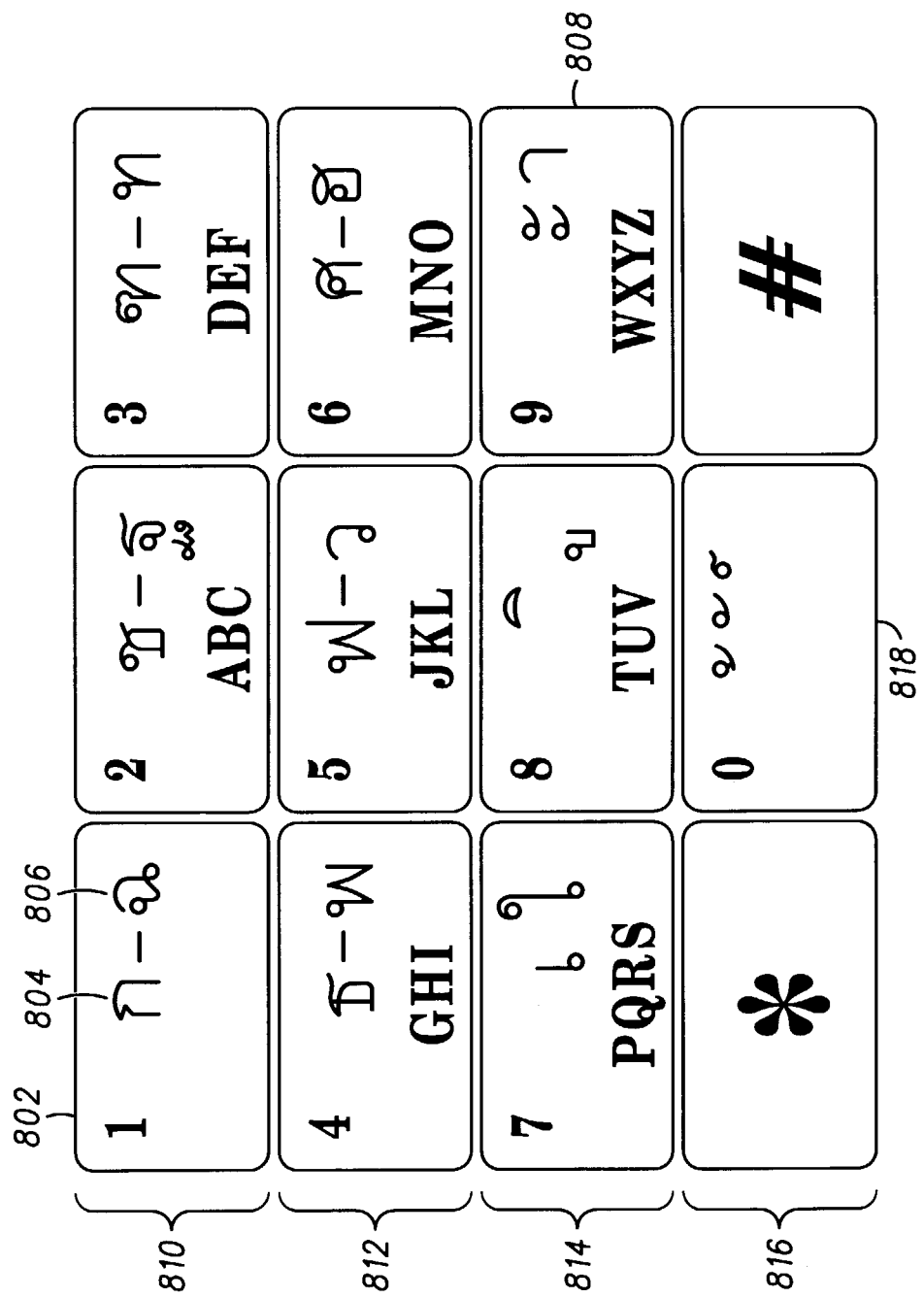
FIG. 8 is a planar view of the second keypad layout of FIG. 7.

Referring to FIG. 8, there is shown the second preferred keypad layout represented by FIG. 7. Similar to FIG. 6, only a few select, representative characters are shown on the face of the keys due to the limited space available for printing characters on the surfaces of the keys. For the consonant characters of the second preferred keypad layout, each alphabetic group represents seven consonant characters, and only the first and last characters representing a particular alphabetic group is provided on the face of each key. For example, for key "1" 802, the first character of the first alphabetic group, Go Gai (TACTIS A1) 804, and the last character of the first alphabetic group, Cho Ching (TACTIS A8) 806, is shown on the face of the key.

The vowel characters of the second preferred embodiment are represented on the face of each key in manner similar to the first preferred keypad layout described above. However, the third subclass 436 for the class of following vowels 410, i.e., the Ru character 312, is not represented on the face of key "9" 808.

Similar to the first preferred keypad layout, the keys of the second preferred keypad layout representing consonant characters are generally grouped together in one group, and the keys representing the vowel characters are generally grouped together in another group substantially separate from the group of consonant characters. As shown in FIG. 8, the keys for the consonant characters are adjacent to each other and are collectively grouped together within the upper half of the keypad layout, i.e., within the first two rows 810, 812 of the user interface 102. Likewise, the keys for the vowel characters are adjacent to each other and collectively grouped together within the lower half of the keypad layout, i.e., within the third and fourth rows 814, 816 of the user interface 102. In fact, most of the vowel characters are located in the third row 814 of the user interface 102. The one exception is that the contracted above vowels 710, 446 are associated with key "0" (zero) 818.

It is important to note that vowel characters, like consonant characters, must be easily accessible via the user interface 102. Predictive text entry requires quick accessibility to all characters commonly used in a writing system (which, for Thai, includes both consonants and vowels). The present invention addresses the above issues by dedicating keys to vowel characters as well as consonant characters and, thus, facilitating data entry of phonetic characters, such as characters of the Thai language. Of course, the present invention facilitates data entry for a variety of systems including, but not limited to, predictive text entry and multitap text entry.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A user interface of a portable electronic device having a plurality of keys comprising:
    a first group of keys representing vowel characters; and
    a second group of keys representing consonant characters, the second group of keys being separate from the first group of keys, wherein the keys representing consonant characters are subdivided into groups based on phonetic pronunciation, whereby all consonant characters of a particular phonetic group are associated with a single key of the second group of keys.

2. The user interface of claim 1, wherein the vowel characters represented by to the first group of keys are subdivided into groups based on at least one of: position of characters relative to each other in a native writing system, similarities of shape among characters, phonetic pronunciation of characters, and alphabetical order of characters in the native writing system.

3. The user interface of claim 1, wherein the first group of keys is subdivided based on vowel class.

4. The user interface of claim 3, wherein each vowel class is at least one of leading vowels, above vowels, below vowels and following vowels.

5. The user interface of claim 1, wherein each key of the second group of keys represents at least two phonetic consonant groups.

6. The user interface of claim 1, wherein the plurality of keys includes at least one numeric key of a numeric keypad.

7. The user interface of claim 6, wherein:
the first group of keys correspond to at least two adjacent keys of the numeric keypad; and
the second group of keys correspond to at least two other adjacent keys of the numeric keypad.

8. The user interface of claim 1, wherein:
one of the first and second groups of keys includes at least two keys of keys 1, 2, 3, 4, 5 and 6; and
the other of the first and second groups of keys includes at least two keys of keys 7, 8, 9 and 0.

9. The user interface of claim 1, wherein the first group of keys includes:

a first key representing leading vowels;
a second key representing above and below vowels; and
a third key representing following vowels.

10. The user interface of claim 1, wherein the second group of keys includes:

a first key representing at least one phonetic group of G, Kh and Ng;
a second key representing at least one phonetic group of J, Ch and N;
a third key representing at least one phonetic group of D, Dt and Th;
a fourth key representing at least one phonetic group of B, Bp, Ph and F;
a fifth key representing at least one phonetic group of M, Y, R and L; and
a sixth key representing at least on phonetic group of W, S, H and null.

* * * * *